Figure 1:
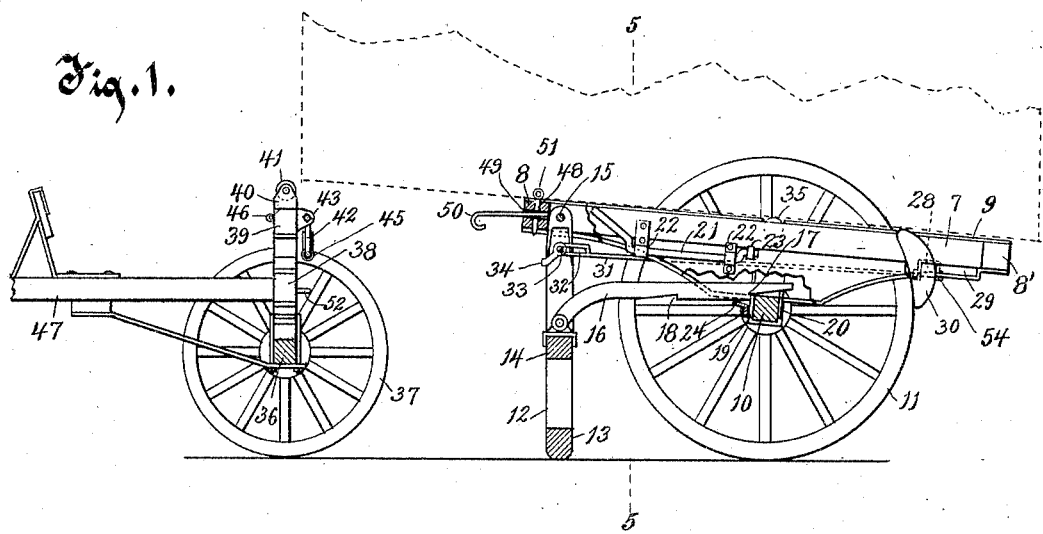

No. 775,998. PATENTED NOV. 29, 1904.
C. G. STREICH.
LUMBER WAGON.
APPLICATION FILED FEB. 8, 1904.
NO MODEL. 2 SHEETS—SHEET 1.

Witnesses:
C. H. Keeney
Anna J. Schmidtbauer

Inventor,
Charles G. Streich
By Benedict & Morsell
Attorneys

No. 775,998. PATENTED NOV. 29, 1904.
C. G. STREICH.
LUMBER WAGON.
APPLICATION FILED FEB. 8, 1904.
NO MODEL. 2 SHEETS—SHEET 2.
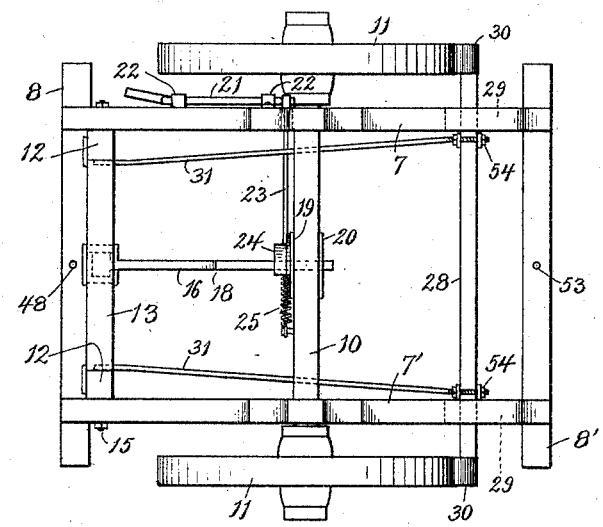
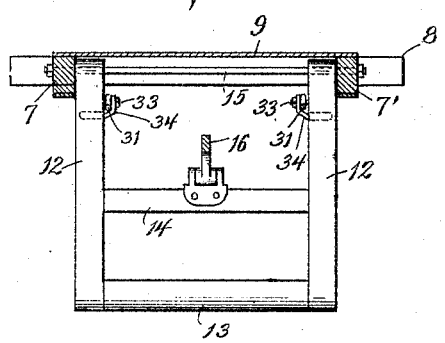
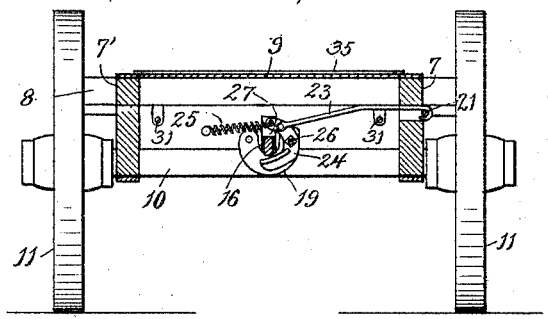
Witnesses.
C. H. Keeney.
Anna F. Schmidtbauer.
Inventor.
Charles G. Streich.
By Benedict & Morsell.
Attorneys.

No. 775,998.                                                     Patented November 29, 1904.

UNITED STATES PATENT OFFICE.

CHARLES G. STREICH, OF OSHKOSH, WISCONSIN.

LUMBER-WAGON.

SPECIFICATION forming part of Letters Patent No. 775,998, dated November 29, 1904.

Application filed February 8, 1904. Serial No. 192,490. (No model.)

*To all whom it may concern:*

Be it known that I, CHARLES G. STREICH, residing at Oshkosh, in the county of Winnebago and State of Wisconsin, have invented a new and useful Improvement in Lumber-Wagons, of which the following is a description, reference being had to the accompanying drawings, which are a part of this specification.

My invention has relation to improvements in lumber-wagons.

It relates to the class of lumber-wagons which comprise front and rear trucks and in which the front truck after the rear truck is loaded is backed rearwardly beneath the forwardly-projecting portion of the load to thereby support said forwardly-projecting portion of the load and permit the load after the same is securely connected to the front truck to be transported to the place where the lumber is to be delivered.

In this class of wagons as heretofore constructed no convenient, durable, and inexpensive means have been provided for supporting the rear truck during the operation of loading, the support usually being effected by means of a temporary prop placed beneath the front portion of the truck.

It is therefore one of the primary objects of my invention to provide an improved construction wherein the truck itself is provided with a pivoted support which when the truck is not being loaded is securely retained beneath the frame of the truck; but during the operation of loading the support is adapted to be turned to a position to support the forward end of said truck and to be securely braced and locked in such supporting position.

Furthermore, in the class of lumber-wagons referred to no entirely satisfactory brake mechanism for engaging the wheels of the rear truck during the operation of loading has been provided, and hence blocks or other tempory expedients to engage the wheels and prevent movement of the truck have been resorted to.

It is a further object of my invention, therefore, to provide an improved and inexpensive construction of brake mechanism, preferably automatically operated by the turning of the pivoted support—that is to say, when the pivoted support is turned beneath the frame of the rear truck the brakes are thrown out of engagement with the wheels, and when the pivoted support is turned downwardly to supporting position the brake mechanism is set or thrown into engagement with the wheels.

In this class of lumber-wagons as heretofore constructed the arrangement has been such that if the forwardly-projecting portion of the lumber on the rear truck is lower than the upwardly-projecting portion of the front truck it has been necessary to lift the forwardly-projecting portion of the lumber manually in order to back the front truck beneath said forwardly-projecting portion of the lumber.

A still further object of my invention, therefore, is the provision on the front truck of suitable mechanism for quickly and easily lifting the forwardly-projecting portion of the lumber, so as to permit the front truck to clear and pass beneath the same when backed rearwardly.

With the above primary and other incidental objects in view the invention consists of the devices and parts or their equivalents, as hereinafter more fully set forth.

Figure 2:
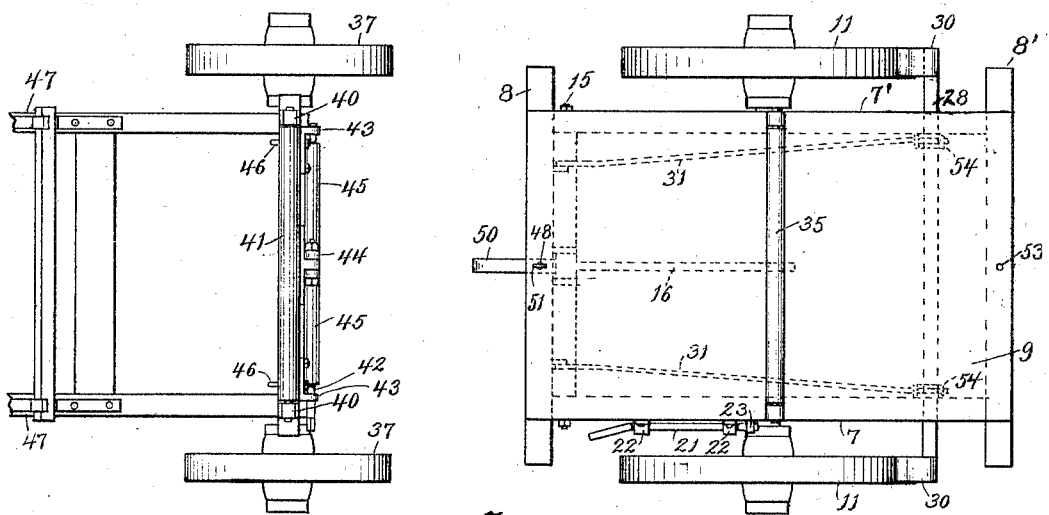
Figure 3:
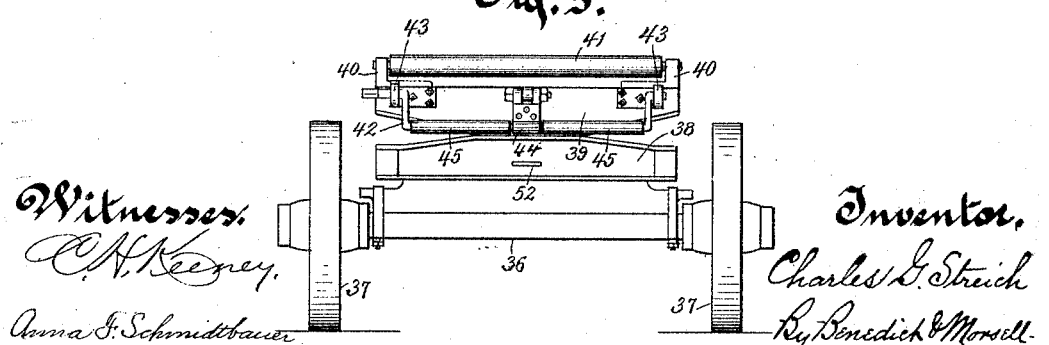

In the accompanying drawings, Figure 1 is a side elevation, parts in section and parts broken away and showing the front truck in position to pass under the front end of the load, the load of lumber on the rear truck being indicated by dotted lines. Fig. 2 is a plan view of Fig. 1, the load of lumber being omitted. Fig. 3 is a rear end view of the front truck. Fig. 4 is an inverted plan view of the rear truck. Fig. 5 is a section on the line 5 5 of Fig. 1 looking toward the left, and Fig. 6 is a section on the same line looking toward the right.

The frame of the rear truck may be of any desirable construction, preferably of rectangular form and consisting of the side timbers 7 7', connecting end timbers 8 8', and the top or flooring 9. This frame carries an axle 10, upon the opposite ends of which are mounted the wheels 11 11.

The pivoted support for the front portion of the rear truck may consist of a single leg or standard pivoted to the frame; but I prefer to employ a support of the character shown in the accompanying drawings and consisting of the upright members or legs 12 12, the lower connecting transverse foot-piece 13, and the intermediate cross-bar or brace 14. The upper ends of the legs 12 are hung or pivoted on a transverse shaft 15, the ends of which are supported in the side timbers 7 7' of the frame. This pivoted support when the rear truck is not being loaded or when it is being transported from one point to another is turned upwardly beneath the frame of the truck; but when the said truck is being loaded with the lumber it is turned to the upright position. (Shown in Fig. 1.) In either position to which the pivoted support is turned it is desirable that it should be held in such position until it is desired to effect a different adjustment thereof. I therefore prefer to employ in connection with the pivoted support a means for holding said support in either of the two positions referred to, and the specific means shown for accomplishing this consists of an arm 16, pivoted to the cross-bar or brace 14 and extending rearwardly therefrom for a desired distance. The under edge of this arm is provided with two oppositely-disposed shoulders, the rear shoulder being indicated by the numeral 17 and the forward shoulder by the numeral 18. When the pivoted support is turned down to the upright supporting position, (shown in Fig. 1,) the rear shoulder 17 engages against the front side of the axle 10; but when the pivoted support is turned upwardly beneath the frame of the truck the arm is forced rearwardly to such an extent as to cause the forward shoulder 18 to engage against the rear face of the axle 10. Both the front and rear faces of said axle are preferably provided with wear-plates 19 and 20, respectively, to take the bearing or thrust of these shoulders.

Of course some means is necessary for releasing the respective shoulders from engagement with the axle in order to permit of the turning of the pivoted support from one position to the other, as otherwise said shoulders would act as stops to prevent such movement of the pivoted support. I therefore provide mechanism for accomplishing the raising of the arm 16, so as to release the shoulder 17 thereof, when the pivoted support is in its upright supporting position and it is desired to swing said support upwardly beneath the frame of the truck and said mechanism also adapted to release the forward shoulder 18 whenever it is desired to swing the pivoted support from its position beneath the truck to its upright supporting position. This mechanism comprises a crank-shaft 21, mounted in suitable bearings 22 22 on the outer side of the side timber 7, said crank-shaft having its forward end extended beyond the bearing and turned upwardly at an angle to form a convenient handle for manipulating the crank-shaft and having its other end extended rearwardly slightly from the rear bearing and connected to a pull-rod 23. The inner end of this pull-rod is connected to a lever 24, which is of an approximately bell-crank form, and to one arm of this lever is connected one end of a coiled spring 25, the opposite end of said spring being connected to the framework. The pivot of the lever 24 is indicated by the numeral 26, and this pivot extends into the front wear-plate 19. Both of the wear-plates 19 and 20 are provided with recesses 27 for the accommodation of the locking-arm 16. The coiled spring 25 exerts a pull on the upper arm of the bell-crank lever in a direction to normally hold the lower arm of the bell-crank lever in a depressed position, so that the locking-arm 16 is permitted to seat itself in the recesses 27. If now the pivoted support is turned upwardly beneath the frame of the rear truck and the forward shoulder 18 is in engagement with the rear wear-plate 20 and it is desired to turn the pivoted support downwardly to supporting position, the crank-shaft is turned, and this turning of said shaft will exert a pull outwardly on the pull-rod 23, and hence a pull will be exerted on the upper arm of the bell-crank lever in a direction to raise the lower arm of said bell-crank lever, and thereby cause said lower arm of the bell-crank lever to raise the locking-arm 16 sufficiently high to clear the forward shoulder 18 from engagement with the rear wear-plate 20. The crank-shaft is held in this position until the shoulder 18 has entirely cleared the wear-plate 20, and at this time the crank-shaft can be released and the pivoted support permitted to drop to supporting position. In practice perhaps a slight forward pull is necessary to be given to the pivoted support to bring it to an upright position and to bring the locking-arm in a position to permit the rear shoulder 17 to engage the forward wear-plate 19. Of course the recoil of the spring 25 returns the bell-crank lever to its normal position—that is, with the lower arm of said bell-crank lever depressed—so as to permit the locking-arm 16 to seat itself in the recesses 27. Whenever it is desired to change the pivoted support from its upright supporting position to a position beneath the frame of the rear truck, exactly the same operation is gone through with.

I also provide in connection with my invention an improved brake mechanism which is preferably operated by the movement of the pivoted support. Referring to this mechanism, the numeral 28 indicates a transverse brake-bar which is disposed at the rear portion of the truck, and its ends pass through guide grooves or ways 29 29 in the side timbers 7 7'. The extremities of this brake-bar carry the brake-shoes 30 30. Connected to the brake-bar and extending forwardly theretical opening 48 and passing through an opening in the shank of the coupling-hook. This coupling-hook is adapted to engage a staple 52, extending rearwardly from the axle reinforcement 38. If desired, also the rear end connecting-timber 8' may be provided with a vertical opening 53 and with an intersecting horizontal opening. (Not shown.) By this means, if desired, the coupling-hook may be locked to and project rearwardly from the rear end timber 8', and the front truck may be coupled to this end of the rear truck whenever desirable or found preferable.

It will be seen that the rear ends of the rods 31, which pass through the openings of the brake-bar 28, are threaded, and engaging these threads on opposite sides of the brake-bar are nuts 54. By this arrangement when the brake-shoes become worn the nuts can be turned and the rods thereby shortened in order to take up this wear, or the rods may be lengthened at any time.

While the forward end of the lumber may be sufficiently elevated to permit the front truck to pass thereunder by making the supporting-legs 12 of the rear truck longer to overcome the sagging of the load, yet if this is done when the front truck is backed under the load it would not raise the front part of the rear truck high enough to raise the supporting-legs 12 above the ground, and consequently said supporting-legs would be prevented from being turned back beneath the frame of the rear truck and which of course is necessary in order to transport the load after the trucks have been loaded. This will more clearly explain the object or function of the crank-shaft 42, carried by the front truck, as hereinbefore referred to.

What I claim as my invention is—

1. In a lumber-wagon, the combination with a truck comprising a frame, an axle mounted therein, and wheels upon the axle, of a support pivoted at the forward end of the truck and adapted to be turned rearwardly beneath the frame of the truck, or turned downwardly to an upright position for supporting the truck, and an arm pivotally connected to the support and extending rearwardly therefrom, said arm provided with oppositely-facing rear and forward shoulders, the former adapted to engage against the forward side of the axle when the support is in an upright position, and the latter adapted to engage against the rear side of the axle when the support is adjusted beneath the frame of the truck.

2. In a lumber-wagon, the combination with a truck comprising a frame, an axle mounted therein, and wheels upon the axle, of a support pivoted at the forward end of the truck and adapted to be turned rearwardly beneath the frame of the truck, or turned downwardly to an upright position for supporting the truck, an arm pivotally connected to the support and extending rearwardly therefrom, said arm provided with oppositely-facing rear and forward shoulders, the former adapted to engage against the forward side of the axle when the support is in an upright position, and the latter adapted to engage against the rear side of the axle when the support is adjusted beneath the frame of the truck, and means for lifting the arm so as to bring either shoulder out of engagement with the axle when it is desired to change the adjustment of the support.

3. In a lumber-wagon, the combination with a truck comprising a frame, an axle mounted therein and having wear-plates secured centrally on opposite faces thereof, each wear-plate provided with a recess, the recesses being in alinement, and wheels mounted upon the axle, of a support pivoted at the forward end of the truck and adapted to be turned rearwardly beneath the frame of the truck, or turned downwardly to an upright position for supporting the truck, an arm pivotally connected to the support and extending rearwardly therefrom, said arm being seated and guided in the recesses of the wear-plates, and being provided with oppositely-facing rear and forward shoulders, the former adapted to engage the forward wear-plate when the support is in an upright position, and the latter adapted to engage the rear wear-plate when the support is adjusted beneath the frame of the truck, and means for lifting the arm out of engagement with the wear-plates when it is desired to change the adjustment of the support.

4. In a lumber-wagon, the combination with a truck comprising a frame, an axle mounted therein, and wheels upon the axle, of a support pivoted at the forward end of the truck and adapted to be turned rearwardly beneath the frame of the truck, or turned downwardly to an upright position for supporting the truck, and a locking-arm pivotally connected to the support and extending rearwardly therefrom, said arm provided with oppositely-facing rear and forward shoulders, the former adapted to engage the forward side of the axle when the support is in an upright position and the latter adapted to engage the rear side of the axle when the support is adjusted beneath the frame of the truck, a pivoted bell-crank lever, the lower arm thereof engaging beneath the locking-arm, a coiled spring secured at one end to the upper arm of the bell-crank lever and at its opposite end to the framework and normally holding the lower arm of the bell-crank lever in a depressed position so as to permit of the lowering of the locking-arm and the engagement of the shoulders thereof with the axle, and means acting on the bell-crank lever to raise the lower arm of the lever against the stress exerted by the spring, to thereby raise the locking-arm sufficiently high to disengage the shoulders thereof from the axle.

from are rods 31 31. The forward ends of said rods are provided with elongated slots 32 32, and these slots are engaged by studs 33 33, projecting laterally from brackets 34 34, secured to the inner sides of the uprights or legs 12 12 of the pivoted support. It will be obvious from the described construction of this brake mechanism that when the pivoted support is in the upright position (shown in Fig. 1) and is turned from said position upwardly beneath the frame of the truck the transverse brake-bar is moved rearwardly in its guides or ways through the medium of the rods 31 31. When the pivoted support is beneath the truck and the pivoted support is then swung downwardly to its upright supporting position, the transverse brake-bar is moved forwardly by reason of the pull exerted by the rods 31, and this forward movement is just sufficient to bring the brake-shoes into firm engagement with the peripheries of the wheels, and hence set the brakes and prevent movement of the truck during the loading operation. In view of the fact that the movement of the pivoted support either from its upright position to a position beneath the truck or from a position beneath the truck to an upright position is considerably greater than the movement of the brake-bar 28 in its guides or ways I provide the elongated slots 32, which allow for the difference.

The rear truck is provided about centrally of the frame with a transverse roller 35, which facilitates the loading and unloading operation.

Referring to the front truck, the numeral 36 indicates the axle, upon the opposite ends of which are mounted the front wheels 37 37. Above the front axle is the axle reinforcement 38, and above said axle reinforcement is the bolster 39. This bolster is provided at opposite ends with upwardly-extending bearing-lugs 40 40, in which are mounted the trunnions or journals of a transverse roller 41, which roller is adapted to engage the under side of the load of lumber when the front truck is backed rearwardly beneath the forwardly-projecting portion of the lumber, and hence reduce friction to the minimum.

As stated at the outset of the specification, in lumber-wagons of the character to which the present invention relates in backing the front truck in order to cause the same to pass beneath the forwardly-projecting portion of the lumber considerable difficulty has been experienced by reason of the fact that the end of said forwardly-projecting portion of the lumber is frequently lower than the upwardly-extending portion of the front truck, and hence the forwardly-extending portion of the lumber has to be raised manually in order to back the front truck beneath the said forward portion of the lumber. I therefore provide, in connection with my invention, an improved mechanism for readily and easily lifting the forwardly-projecting portion of the lumber, so that the upwardly-extending portion of the front truck carrying the roller may pass beneath the lumber without difficulty. This mechanism consists of a crank-shaft 42, the cranked ends of which are mounted in bearings 43 43, projecting from the rear side of the bolster 39. For the purpose of conserving strength I also prefer to provide a pivoted bearing 44, pivotally connected to an approximately central point of the bolster and through which bearing the crank-shaft also passes. On the crank-shaft on opposite sides of the pivoted bearing 44 are rollers 45 45. Of course where the central pivoted bearing 44 is dispensed with only one roller may be employed. A roller or rollers, however, is or are not absolutely necessary, as the crank-shaft itself will effect the lifting of the lumber; but the rollers are advantageously employed in order to reduce friction. One of the cranked ends of the crank-shaft is extended and may be square in cross-section for the engagement therewith of a suitable turning-tool. In the use of this mechanism if the forwardly-projecting portion of the lumber is on a plane below the roller 41 the crank-shaft 42 is turned upwardly into engagement with the lumber and will necessarily effect the elevation of said lumber to such an extent as to permit the front truck to pass beneath the load and perform its function of supporting the forwardly-extending portion of the load. The force applied to the crank-shaft is now removed, and said shaft swings forwardly against the bolster, resting against said bolster near the upper edge thereof and in that position is below the top of the roller, and hence is relieved of all strain. The crank-shaft remains in this position until the unloading is completed, when it may be swung back to normal position. (Shown in Figs. 1 and 3.) After the front truck is backed rearwardly in the manner above explained it then becomes necessary to secure the truck. For this purpose I employ the eyes 46 46. It will be understood that a chain is passed over the lumber, and these eyes form a means for connecting the ends of the chain to the front truck.

Projecting from the front truck are the usual thills or shafts 47 47.

Whenever the wagon is not being loaded with lumber or is not being employed in transporting lumber from one point to another and it is desired to move both front and rear trucks to different places, it is necessary to couple the same together. For this purpose I provide the front connecting end timber 8 of the frame of the rear truck with a vertical opening 48 and with an intersecting horizontal opening 49. Adapted to extend into the horizontal opening is a coupling-hook 50. This hook is removably locked in place by means of a coupling-pin 51, fitting in the ver- 5. In a lumber-wagon, the combination with a truck comprising a frame, an axle mounted therein, and wheels upon the axle, of a support pivoted at the forward end of the truck and adapted to be turned rearwardly beneath the frame of the truck, or turned downwardly to an upright position for supporting the truck, an arm pivotally connected to the support and extending rearwardly therefrom, said arm provided with oppositely-facing rear and forward shoulders, the former adapted to engage the forward side of the axle when the support is in an upright position, and the latter adapted to engage the rear side of the axle when the support is adjusted beneath the frame of the truck, a pivoted bell-crank lever, the lower arm thereof engaging beneath the locking-arm, a coiled spring secured at one end to the upper arm of the bell-crank lever and at its opposite end to the framework and normally holding the lower arm of the bell-crank lever in a depressed position so as to permit of the lowering of the locking-arm and the engagement of the shoulders thereof with the axle, a pull-rod engaging the upper arm of the bell-crank lever, and a crank-shaft engaging the outer end of the pull-rod.

6. A front truck for a lumber-wagon, comprising a frame, an axle mounted therein, wheels on the axle, a support for the lumber in the upper portion of the frame, and mechanism adjacent to the support and adapted under one adjustment to engage the lumber projecting forwardly from a rear truck and raise said lumber sufficiently high to permit the front truck to pass therebeneath and allow the projecting portion of the lumber to rest on the support of the frame of said front truck.

7. A front truck for a lumber-wagon, comprising a frame, an axle mounted therein, wheels on the axle, a support for the lumber in the upper portion of the frame, a crank-shaft journaled in the frame and adjacent to the support and adapted to engage the lumber projecting forwardly from a rear truck and raise said lumber sufficiently high to permit the front truck to pass therebeneath and allow the projecting portion of the lumber to rest on the support of the frame of said front truck.

8. A front truck for a lumber-wagon, comprising a frame, an axle mounted therein, wheels on the axle, a crank-shaft journaled in the frame and adapted when turned upwardly to engage lumber projecting forwardly from the rear truck and raise said lumber sufficiently high to permit the front truck to pass therebeneath, and a roller or rollers on the crank-shaft.

9. In a lumber-wagon, the combination with a truck comprising a frame, an axle mounted therein, and wheels upon the axle, of a support pivoted at the forward end of the truck and adapted to be turned rearwardly beneath the frame of the truck, or turned downwardly to an upright position for supporting the truck, a brake-bar, brake-shoes at opposite ends of the bar, a connection between the brake-bar and the support and adapted, when the support is turned rearwardly beneath the frame of the truck, to throw the brake-shoes out of engagement with the wheels, and when turned downwardly to supporting position, to bring the brake-shoes into engagement with the wheels, and means for adjusting the connection between the brake-bar and the support, in order to shorten or lengthen the same.

10. In a lumber-wagon, the combination with a truck comprising a frame, an axle mounted therein, and wheels upon the axle, of a support pivoted at the forward end of the truck and adapted to be turned beneath the frame of the truck, or turned downwardly to an upright position for supporting the truck, a brake-bar, brake-shoes at opposite ends of the bar, and a rod or rods having their rear end or ends threaded and extending through the brake-bar, and the forward end or ends thereof connected to the support, and nuts upon the threads of the rod or rods, and adapted when turned to shorten or lengthen said rod or rods.

11. In a lumber-wagon, the combination with a truck comprising a frame, an axle mounted therein, and wheels upon the axle, of a support pivoted at the forward end of the truck and adapted to be turned rearwardly beneath the frame of the truck, or turned downwardly to an upright position for supporting the truck, and an arm pivotally connected to the support and extending rearwardly therefrom and over the axle of the truck, means for holding the arm detachably to the axle when the support is in an upright position, and means for holding the arm to the axle when the support is swung inwardly beneath the frame of the truck.

In testimony whereof I affix my signature in presence of two witnesses.

CHARLES G. STREICH.

Witnesses:
A. L. MORSELL,
ANNA F. SCHMIDTBAUER.